United States Patent

Schrader

[15] 3,668,581

[45] June 6, 1972

[54] METHOD OF ENERGIZING FULLY PERSISTENT, HIGH FIELD, HIGH HOMOGENEITY MAGNETS

[72] Inventor: Edward Robert Schrader, Hightstown, N.J.

[73] Assignee: RCA Corporation

[22] Filed: Dec. 17, 1969

[21] Appl. No.: 885,810

[52] U.S. Cl. ............................................335/216, 317/123

[51] Int. Cl. ............................................H01f 7/22

[58] Field of Search ..............335/216; 317/123; 174/DIG. 6

[56] References Cited

UNITED STATES PATENTS 3,233,155 2/1966 Atherton ..............................335/216

3,281,738 10/1966 Hanak ..............................335/216

FOREIGN PATENTS OR APPLICATIONS 1,283,960 11/1968 Germany ..............................335/216

*Primary Examiner*—G. Harris

*Attorney*—Edward J. Norton

[57] ABSTRACT

A superconductive magnet includes a plurality of concentric superconductor rings disposed on a substrate disc which has a bore in the center thereof. A magnetic field permeates through the rings which are then caused to be switched between a normal and a superconductive state according to a predetermined program. The shifting of the states of the rings creates a high flux density in the disc bore.

12 Claims, 10 Drawing Figures

INVENTOR.
Edward R. Schrader
BY Edward J. Norton
ATTORNEY

PATENTED JUN 6 1972

3,668,581

INVENTOR.
Edward R. Schrader
BY
Edward J. Norton
ATTORNEY

METHOD OF ENERGIZING FULLY PERSISTENT, HIGH FIELD, HIGH HOMOGENEITY MAGNETS

This invention relates to a superconductive magnet and a method of energizing that magnet and more particularly to a fully persistent, high field, high homogeneity magnet.

Until now it has not been practical to provide very high field (e.g., order of 100,000 gauss) and high homogeneity superconductive magnets suitable for use, for instance, in nuclear magnetic resonance spectrocopy, because it is not conveniently possible to energize a superconductive magnet containing an endless superconductor without resistant joints. Even the slightest resistance formed in joining two pieces of superconductor together causes a decay in the field produced when current flows in that superconductor and thus such operation is referred to as being in a semi-persistent mode.

This decay with time is too great to be used in the nuclear magnetic resonance type work. It is desirous to have a magnet with no resistive joints, and thus operating in the fully persistent mode, which will produce a very high magnetic field. One approach in which no resistive joints exist is described in U.S. Pat. No. 3,281,738 by J. J. Hanak entitled SUPERCONDUCTING SOLENOID. This type of device includes a stack of individual disks each of which has a central bore. Around the central bore of each disk is located several concentric rings of superconductive material, each having a very narrow radial width. When these disks are formed into a magnetic structure, a high field in the bore of this magnet is provided by a source of a still higher field surrounding the stack of disks. However, the use of the external magnet can be difficult and expensive to fabricate and operate because of the large size and field necessary.

It is also theoretically possible to pump magnetic flux into the persistent current solenoid such as described in U.S. Pat. No. 3,244,943 by A. F. Hildenbrandt et al., entitled CONTINUOUS MAGNETIC-FLUX PUMP. Again, the extremely high fields are difficult to achieve, and the apparatus is large and difficult to operate.

It is an object of this invention to provide an improved superconductive magnet.

In accordance with an embodiment of this invention, there is provided a superconductive magnet which includes a plurality of superconductor material concentric rings, each of which is capable of assuming either a normal state or a superconductive state. A magnetic structure is provided around these rings and means are further provided to selectively cause the rings, in a predetermined order, to change from one of the states to the other of the states.

Figure 1A:
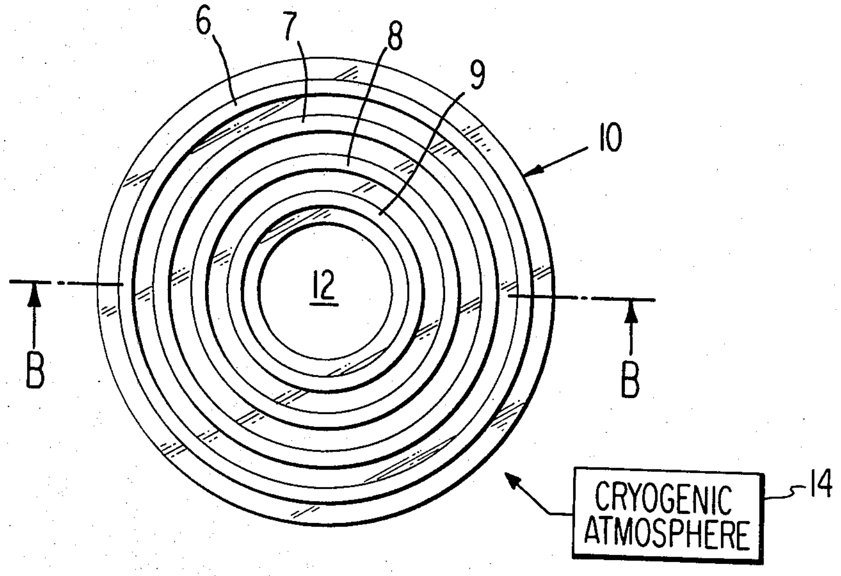
Figure 1B:
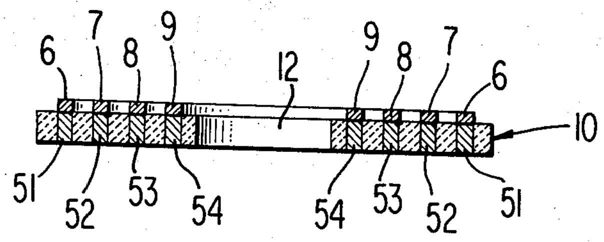
Figure 2:
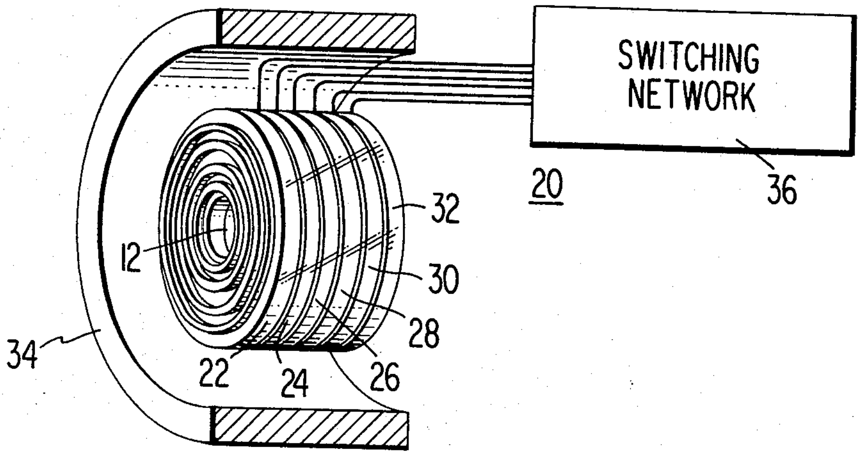

An embodiment of the invention is described hereinafter with specific reference being made to the following figures:

FIGS. 1*a*, 1*b* show a disk having a plurality of concentric superconductive material rings thereon;

FIG. 2 shows a plurality of the disks as shown in FIG. 1 arranged inside a magnet; and FIGS. 3*a* –*g* includes several diagrams which show rings similar to those in the structure of FIGS. 1*a*, 1*b* and 2 being selectively shifted between the superconducting and the normal states.

Referring now to FIG. 1*a*, the top view of a disk 10 is shown having a central bore 12 and a plurality of concentric superconductor material rings 6–9. Rings 6–9 may be of any superconductive material such as niobium tin ($Nb_3S_n$). Although only four rings are shown in disk 10, it should be understood that in actual practice many more of these rings will be present. These rings are formed on the disk by depositing a layer of $Nb_3S_n$ and etching away certain regions such that the rings 6–9 are formed. To prevent flux jumping, the radial width of each ring should be a maximum of about 10 mils. A disk such as disk 10 is more fully described in the above-mentioned Hanak U.S. Pat. No., 3,281,738.

In FIG. 1*b*, a cross sectional view of the structure shown in FIG. 1*a*, taken along lines B—B, is shown. Beneath each of the concentric rings 6–9, there is provided, in intimate physical contact but electrical isolation from rings 6–9, heater type elements 51–54 such as a resistance which may be deposited in the disk 10 by known methods. Elements 51–54 each have a lead electrically in contact therewith for applying power thereto. When a current is applied to any preselected respective one or more of the heater elements 51–54, heat is produced thereby and the respective corresponding ring or rings 6–9, associated therewith is rendered normal. Otherwise each ring 6–9 is superconductive. It should be noted that the components described above and hereinafter will be in a cryogenic atmosphere provided by suitable apparatus as represented by block 14, such that the surrounding temperature would be in the order of the temperature of liquid helium and that proper magnetic fields and current densities will be present to allow the superconductor material rings 6–9 to be rendered superconductive in the absence of heat produced by heating elements 51–54.

In FIG. 2, a superconductive magnet structure 20 is shown which includes a plurality of disks 22, 24, 26, 28, 30 and 32 which are each similar to disk 10 of FIG. 1*a*, 1*b*. The disks 22, 24, 26, 28, 30 and 32 are axially aligned with respect to each other inside a hollow magnetic structure 34 which provides a magnetic field across the entire area of the disks 22, 24, 26, 28, 30 and 32. A switching network 36 is also provided which selectively applies current individually to each respective one of resistive heating elements 51–54 in accordance with a preselected arrangement so that they in turn render the respective rings associated therewith either superconductive or normal. In a relatively simple magnetic structure of the type described herein, each respective one of resistive heater elements 51–54 of the several disks can be respectively connected to a corresponding aligned heater element 51–54, respectively, of the next adjacent disk so that for example, the outermost ring 6 of each aligned disk would be heated at the same time, the next outermost ring 7 of each aligned disk would be heated at the same time, and so forth. Other combinations are, of course, possible so that rings at different axial and radial positions can be simultaneously switched to provide varying field shaping.

Referring to FIGS. 3*a* –*g*, there is shown several different diagrams illustrating the various steps which result in a high field in a center bore 12 of the several disks 22, 24, 26, 28, 30 and 32 of FIGS. 1*a*, 1*b* and 2. In FIG. 3 it is assumed that each disk has eight concentric rings 40–47 thereon, instead of four as illustrated in FIGS. 1 and 2, although in a practical device, many more would be provided. Ring 47 is adjacent bore 12. The designation used throughout FIG. 3 is that a light circle represents a ring in a normal state and a dark circle represents the ring in the superconductive state. Circles with an X inside represent rings in the intermediate state. In this latter state, the rings are superconductive, but the flux intensity is sufficiently high such that the flux rejection characteristic of the rings is overcome and flux pervades the rings. Further, the dashed lines represent field strength, the magnitude of which is shown by the relative length of the corresponding arrows as will be described. It should be understood that whenever a particular ring goes from the normal state to the superconductive state, some portion of the flux which had been contained within the volume of the superconductor is displaced toward the bore 12 and the remaining portion of the flux is displaced in the opposite direction. Thus, the flux within the rings rendered superconductive is lower than before.

Figure 3A:
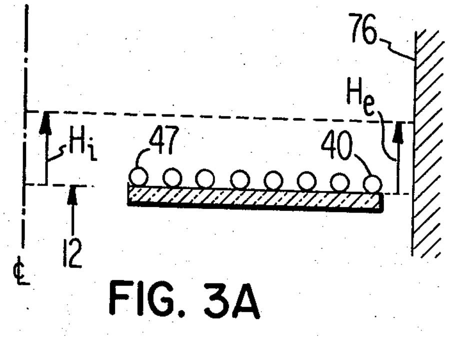

In FIG. 3*a*, it is seen that initially each of the concentric rings 40–47 are in the normal state and the external magnetic field $H_e$ applied by magnet 76, which is similar to magnet 34 of FIG. 2, is constant throughout the entire structure by way of example only. Thus, the magnetic field $H_i$ in the axially aligned bore 12 of the several disks is equal to the external magnetic field $H_e$. A switching network such as network 36 of FIG. 2 causes each respective one or preselected groups of rings 40–47 to go from the normal state to the superconductive state at least one at a time beginning with the outermost ring 40 and proceeding towards the innermost ring 47.

Figure 3E:
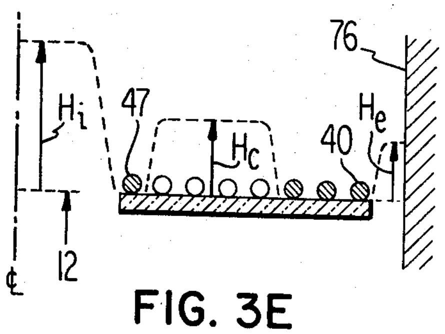
Figure 3B:
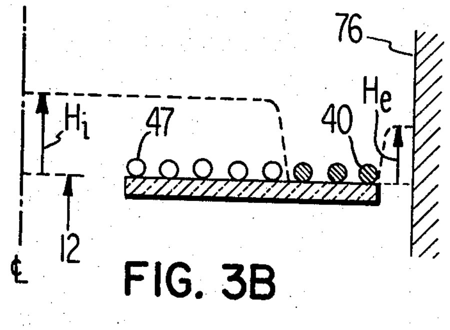
Figure 3F:
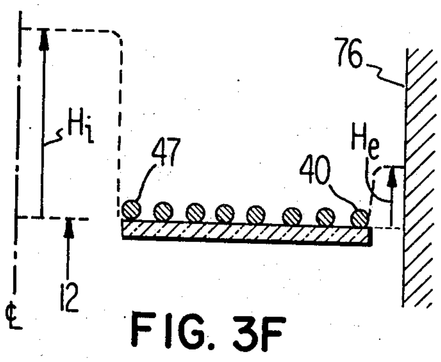

FIG. 3*b* shows the state of the magnetic field after the first three rings have been rendered superconductive. It is seen that the internal magnetic field $H_i$ in the bore 12 has increased such that magnetic field $H_i$ is now greater than magnetic field $H_e$. This is because as a ring becomes superconductive, some of the flux is displaced inward toward bore 12, as indicated above.

Figure 3C:
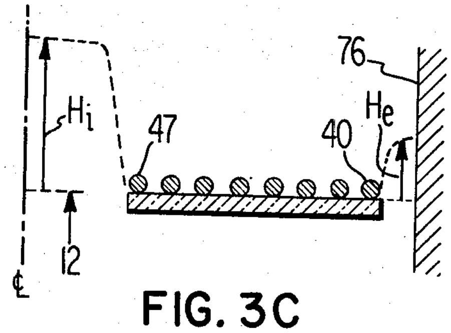

FIG. 3*c* shows the magnetic field when all of the rings have been initially rendered superconductive. It is seen that internal field $H_i$ has further increased over external field $H_e$.

Figure 3D:
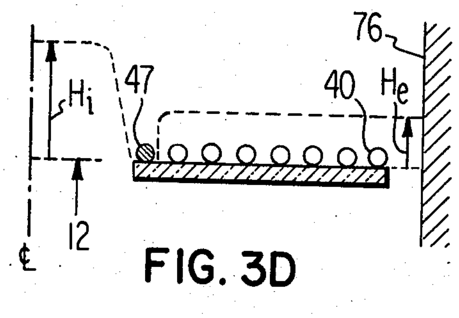

Immediately after all of the rings have been rendered superconductive, all, except the innermost ring or group of rings, as the case may be, are rendered normal, as seen in FIG. 3*d*. In this situation, for example, the innermost ring is maintained superconductive, which retains the internal field $H_i$ as indicated, while the external field $H_e$ is applied over the several outermost rings which are now normal.

The same procedure as previously described is repeated. First, the outermost ring or rings are rendered superconductive, then the next adjacent ring or rings are rendered superconductive, and so forth. FIG. 3*e* shows the state of the magnetic field that exists after the three outermost rings have been rendered superconductive a second time. The external field is applied only up to the outermost ring 40. The internal field $H_i$ remains the same as previously shown in FIG. 3d. However, now there is a central field $H_c$ trapped over the four remaining rings. As each ring or group of rings, as the case may be, is rendered superconductive, this central field increases in intensity so that, as seen in FIG. 3*e*, the external field $H_e$ has the smallest intensity, the central field $H_c$ has the next largest intensity and the internal field $H_i$ has the largest intensity. The procedure of rendering the rings superconductive in the order described is continued until all of the rings are rendered superconductive forcing the central field $H_c$ into the internal field $H_i$. As seen in FIG. 3f, this again increases the internal field $H_i$. Of course, as the field $H_i$ gets higher, the magnitude of field $H_i$ may require more than just the innermost ring to be superconductive in order to retain the field $H_i$ in the bore 12.

Figure 3G:
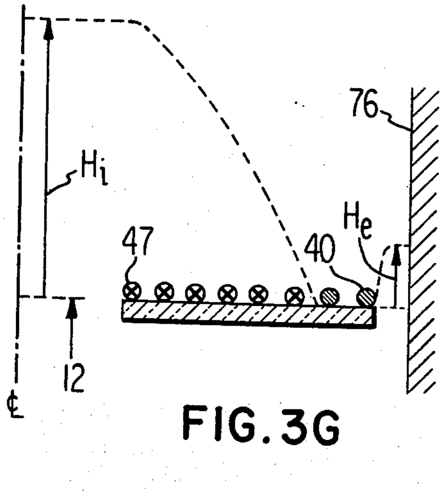

The procedure described is continued until the desired internal field is obtained. In a practical situation, however, when the field $H_i$ reaches the desired level, which may be very high, the superconductor does not completely reject all of the flux. Such superconductors are in the intermediate state described above. FIG. 3*g* shows the condition of the internal field $H_i$ when the innermost rings (those circles with an *x*) revert to this latter state. Here, the flux of field $H_i$, due to its intensity, is shown overlapping most of the rings. In any case, the procedure used to create the high internal field $H_i$ is the procedure described above.

What is claimed is:

1. A superconductive magnet of the type intended for use in a cryogenic atmosphere comprising:

a plurality of superconductor material concentric rings each being capable of assuming a normal state and a superconductive state;

a magnetic field producing structure around said rings; and switching means coupled to said rings for causing said rings to assume selectively one of said states in accordance with a predetermined program, said rings being so positioned with respect to each other such that when said rings are caused to assume said states, flux is effectively pumped solely by the switching of said states providing a significantly high magnetic field without the use of moving parts in said atmosphere.

2. The invention according to claim 1 wherein all of said rings are initially in the normal state and said switching means causes all of said rings to go to the superconductive state at least one at a time in the order from the outermost ring to the innermost ring.

3. The invention according to claim 1 wherein all of said rings are initially in the normal state;

wherein said switching means first causes all of said rings to go to the superconductive state at least one at a time in the order from the outermost ring to the innermost ring;

wherein said switching means thereafter causes at least one of the innermost rings to remain in the superconductive state and the remaining rings to return to the normal state; and wherein said switching means thereafter causes said remaining rings to return to the superconductive state at least one at a time in the order from said outermost ring towards said innermost ring.

4. The invention according to claim 1 wherein said magnet further includes a disk-like substrate having a center hole therein, said rings being affixed concentrically on said substrate.

5. The invention according to claim 1 wherein said rings have a radial width of no more than 10 mils.

6. The invention according to claim 1 wherein said magnet further includes a plurality of disks each having a central bore therein, each of said disks having said plurality of superconductor material concentric rings affixed thereon around said bore, said disks being stacked in axial alignment with respect to each other within said magnetic structure such that said rings are electrically insulated from one another.

7. The invention according to claim 1, said switching means including a separate heating element in physical contact with, but electrically insulated from each of said rings, and means connected to said heating elements for operating same according to said predetermined program to cause said rings to assume selectively one of said states.

8. A method of pumping flux in a superconductive magnet of the type operated in a cryogenic atmosphere comprising the steps of:

providing a plurality of superconductor material concentric rings each being capable of assuming a normal state and a superconductive state, providing a magnetic field to said rings, positioning said rings with respect to each other such that when said rings are caused to assume said states in accordance with a predetermined program, flux is effectively pumped solely by the switching of said states providing a significantly high magnetic field without the use of moving parts in said atmosphere, and selectively causing each of said superconductor material concentric rings to shift between a superconductive state and a normal state in accordance with said predetermined program.

9. The method according to claim 8 wherein said predetermined program includes the further step of causing each of said rings to assume the normal state, and thereafter causing said rings to assume the superconductive state at least one at a time in the order from the outermost ring to the innermost ring.

10. The method according to claim 8 wherein said predetermined program includes the further steps of causing each of said rings to assume the normal state, causing said rings to assume the superconductive state at least one at a time in the order from said outermost ring to said innermost ring, causing a certain number of adjacent ones of said rings removed from said innermost ring to assume the normal state, and causing said certain number of rings to assume the superconductive state at least one at a time in the order from said outermost ring towards said innermost ring.

11. A superconductive magnet for use in a cryogenic atmosphere comprising:

a plurality of superconductor material concentric rings each being capable of assuming a normal state and a superconductive state, all of said rings being initially in the normal state;

a magnetic field producing structure around said rings; and switching means coupled to said rings for causing said rings to assume selectively one of said states in accordance with a predetermined program;

said switching means first causing all of said rings to go to the superconductive state at least one at a time in the order from the outermost ring to the innermost ring;

said switching means thereafter causing at least one of the innermost rings to remain in the superconductive state and the remaining rings to return to the normal state; and said switching means thereafter causing said remaining rings to return to the superconductive state at least one at a time in the order from said outermost ring towards said innermost ring.

12. A superconductive magnet for use in a cyrogenic atmosphere comprising:

a plurality of superconductor material concentric rings each being capable of assuming a normal state and a superconductive state;

a plurality of disks each having a central bore therein, each of said disks having said plurality of superconductor material concentric rings affixed thereon around said bore, said disks being stacked in axial alignment with respect to each other within said magnetic structure with said rings electrically insulated from one another, a magnetic field producing structure around said rings; and switching means coupled to said rings for causing said rings to assume selectively one of said states in accordance with a predetermined program.

* * * * *